US008264823B2

(12) United States Patent
Kim et al.

(10) Patent No.: US 8,264,823 B2

(45) Date of Patent: Sep. 11, 2012

(54) FOLDABLE MOBILE TERMINAL

(75) Inventors: Chi-Young Kim, Seoul (KR); Jun-Yeob Seong, Seoul (KR); Byoung-Chul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 272 days.

(21) Appl. No.: 12/714,402

(22) Filed: Feb. 26, 2010

(65) Prior Publication Data

US 2010/0328860 A1 Dec. 30, 2010

(30) Foreign Application Priority Data

Jun. 25, 2009 (KR) ........................ 10-2009-0057254
Sep. 22, 2009 (KR) ........................ 10-2009-0089770

(51) Int. Cl.

*H05K 5/00* (2006.01)
*H05K 7/00* (2006.01)
*H04M 1/00* (2006.01)
*G06F 3/041* (2006.01)

(52) U.S. Cl. ......... 361/679.01; 361/679.06; 361/679.26; 361/679.27; 361/679.3; 455/575.1; 455/575.3; 455/575.4; 345/173

(58) Field of Classification Search .................. 361/681, 361/683, 679.01, 801, 804, 679.29, 679.02, 361/679.08, 679.09, 679.3, 679.55–679.59; 455/575.1, 575.3, 575.4, 575.8
See application file for complete search history.

(56) References Cited

U.S. PATENT DOCUMENTS

2003/0041413 A1 3/2003 Huong
2005/0075151 A1 4/2005 Hou
2005/0245288 A1* 11/2005 Priestman et al. ......... 455/569.1
2007/0046561 A1 3/2007 Cheon et al.
2008/0242359 A1* 10/2008 Seol et al. ..................... 455/566

FOREIGN PATENT DOCUMENTS

| | | |
|---|---|---|
| EP | 0898223 | 2/1999 |
| EP | 1324570 | 7/2003 |
| EP | 1758345 | 2/2007 |
| EP | 1775925 | 4/2007 |
| GB | 2328343 | 2/1999 |
| JP | 04307841 | 10/1992 |
| WO | 02/089343 | 11/2002 |
| WO | 08/018677 | 2/2008 |

* cited by examiner

*Primary Examiner* — Jayprakash N Gandhi
*Assistant Examiner* — Jerry Wu
(74) *Attorney, Agent, or Firm* — Lee, Hong, Degerman, Kang & Waimey

(57) ABSTRACT

A portable terminal includes a first body having a first touch screen on an outer surface of the first body, a second body having a second touch screen on an outer surface of the second body, and a hinge unit configured to rotatably connect the first body and the second body. The first touch screen and the second touch screen face the same direction in an unfolded configuration, and the first touch screen and the second touch screen face each other in a folded configuration. The portable terminal further includes a rotation preventing unit configured to prevent relative rotation of the first body and the second body in the absence of an action for relative rotation when the portable terminal is in the unfolded configuration.

15 Claims, 16 Drawing Sheets

FOLDABLE MOBILE TERMINAL

CROSS-REFERENCE TO A RELATED APPLICATION

Pursuant to 35 U.S.C. §119(a), this application claims the benefit of earlier filing dates and right of priority to Korean Application No. 10-2009-0057254 filed on Jun. 25, 2009 and 10-2009-0089770 filed on Sep. 22, 2009, the contents of which are incorporated by reference herein in their entirety.

FIELD OF THE INVENTION

The present disclosure relates to a portable terminal with touch screens. The present disclosure further relates to a foldable portable terminal with at least two touch screens exposed in both closed, or folded, and open, or unfolded, configurations.

BACKGROUND OF THE INVENTION

Terminals may be divided into mobile/portable terminals and stationary terminals according to their mobility. The mobile/portable terminals may be categorized into a hand-held terminal and a vehicle mount terminal depending on how they are carried by a user.

As the mobile terminal becomes multifunctional, the mobile terminal can be implemented as an integrated multimedia device. For example, the multifunctional mobile terminal may be used to capture still images or moving images, play music or video files, play games, and receive broadcast. Various new attempts have been made for the integrated multimedia device by hardware or software in order to implement such diverse multimedia functions.

Further, many users use their mobile terminals to express their personalities, and thus, various designs of mobile terminals are demanded by the users. Accordingly, the mobile terminals are implemented in various types, for example, a bar type, a slide type, a folder type, and a swivel type. Recently, various attempts have been made to introduce a new type of structure for the mobile terminal to implement more convenient multimedia environments.

SUMMARY OF THE INVENTION

According to an embodiment of the present invention, a portable terminal includes a first body having a first touch screen on an outer surface of the first body, a second body having a second touch screen on an outer surface of the second body, a hinge unit configured to rotatably connect the first body and the second body, wherein the first body and the second body are configured to relatively rotate via the hinge unit in a first direction to be in an unfolded configuration in which the first touch screen and the second touch screen face the same direction and relatively rotate via the hinge unit in a second direction to be in a folded configuration in which the first touch screen and the second touch screen face each other.

The terminal further includes a rotation preventing unit configured to prevent relative rotation of the first body and the second body in the second direction in the absence of an action for the relative rotation when the portable terminal is in the unfolded configuration.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used interchangeably.

Portable terminals described in the present disclosure may include mobile phones, smart phones, laptop computers, digital broadcasting terminals, personal digital assistants (PDAs), portable multimedia players (PMPs), and navigators.

Figure 1:
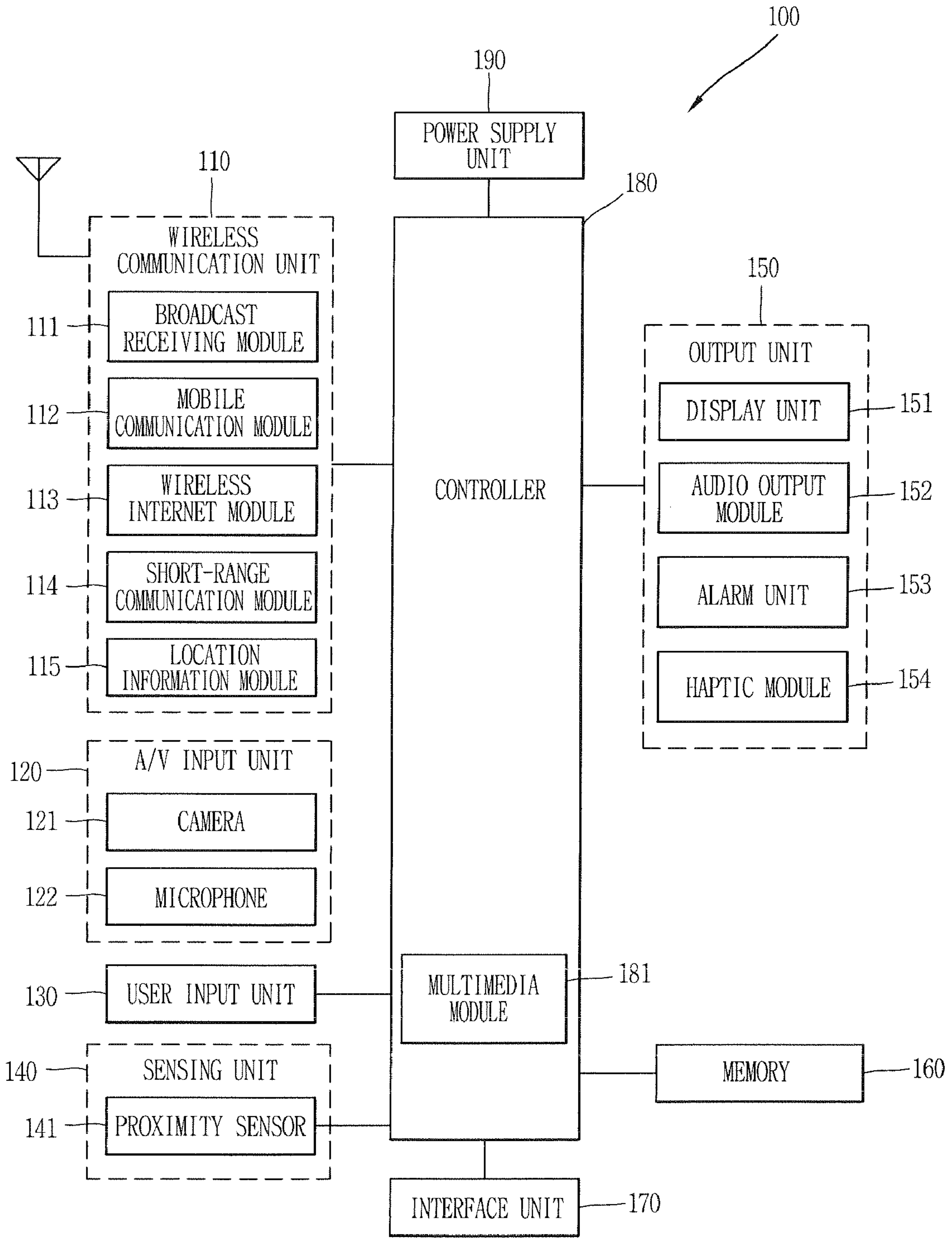
FIG. 1 is a block diagram of a mobile terminal in accordance with an embodiment of the present invention.

Referring to FIG. 1, a portable terminal 100 may comprise components, such as a wireless communication unit 110, an Audio/Video (NV) input unit 120, a user input unit 130, a sensing unit 140, an output unit 150, a memory 160, an interface unit 170, a controller 180, and a power supply unit 190. FIG. 1 shows the portable terminal 100 having various components, but it is understood that implementing all of the illustrated components is not a requirement and greater or fewer components may alternatively be implemented. Hereinafter, each component is described in sequence.

The wireless communication unit 110 typically includes one or more modules which permit wireless communications between the portable terminal 100 and a wireless communication system or between the portable terminal 100 and a network within which the portable terminal 100 is located. For example, the wireless communication unit 110 may include a broadcast receiving module 111, a mobile communication module 112, a wireless Internet module 113, a short-range communication module 114, and a location information module 115.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the portable terminal 100. The broadcast signal may be implemented as a TV broadcast signal, a radio broadcast signal, or a data broadcast signal, among others. The broadcast signal may further include a data broadcast signal combined with a TV or radio broadcast signal.

Examples of the broadcast associated information include information associated with a broadcast channel, a broadcast program, and a broadcast service provider. The broadcast associated information may be provided via a mobile communication network, and received by the mobile communication module 112.

The broadcast associated information may be implemented in various formats. For example, the broadcast associated information includes Electronic Program Guide (EPG) of Digital Multimedia Broadcasting (DMB) and Electronic Service Guide (ESG) of Digital Video Broadcast-Handheld (DVB-H).

The broadcast receiving module 111 may be configured to receive digital broadcast signals transmitted from various types of broadcast systems. For example, the broadcast systems include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from a network entity, such as base station, an external portable terminal, or a server, on a mobile communication network. For example, the wireless signals include audio call signals, video (telephony) call signals, or various formats of data according to transmission/reception of text/multimedia messages.

The wireless Internet module 113 supports wireless Internet access for the portable terminal 100. This wireless Internet module 113 may be internally or externally coupled to the portable terminal 100. Examples of such wireless Internet access may include Wireless LAN (WLAN) (Wi-Fi), Wireless Broadband (Wibro), Worldwide Interoperability for Microwave Access (Wimax), and High Speed Downlink Packet Access (HSDPA).

The short-range communication module 114 denotes a module for short-range communications. Suitable technologies for implementing the short-range communication module 114 may include BLUETOOTH®, Radio Frequency IDentification (RFID), Infrared Data Association (IrDA), Ultra-WideBand (UWB), and ZigBee®.

The location information module 115 denotes a module for detecting or calculating a position of a portable terminal 100. An example of the location information module 115 is a Global Position System (GPS) module.

The A/V input unit 120 is configured to provide audio or video signal input to the portable terminal 100. For example, the NV input unit 120 includes a camera 121 and a microphone 122.

The camera 121 receives and processes image frames of still pictures or video obtained by image sensors in a video call mode or a capturing mode. The processed image frames may be displayed on a display unit 151. The image frames processed by the camera 121 may be stored in the memory 160 or transmitted externally via the wireless communication unit 110. Two or more cameras 121 may be provided according to the configuration of the portable terminal 100.

The microphone 122 may receive an external audio signal while the portable terminal 100 is in a particular mode, such as a phone call mode, a recording mode, or a voice recognition mode. This audio signal is processed into digital data. The processed digital data is converted for output into a format transmittable to a mobile communication base station via the mobile communication module 112 in the phone call mode. The microphone 122 may include assorted noise removing algorithms to remove noise generated in the course of receiving the external audio signal.

The user input unit 130 receives input data from a user to control the operation of the portable terminal 100. For example, the user input unit 130 includes a keypad, a dome switch, a touchpad (e.g., static pressure/capacitance), a jog wheel, or a jog switch.

The sensing unit 140 provides status measurements of various aspects of the portable terminal 100. For example, the sensing unit 140 detects an open/close status of the portable terminal 100, a change in a location of the portable terminal 100, a presence or absence of user contact with the portable terminal 100, the location of the portable terminal 100, and acceleration/deceleration of the portable terminal 100 so as to generate a sensing signal for controlling the operation of the portable terminal 100. The sensing unit 140 may further include a proximity sensor 141.

In case of a slide-type portable terminal, the sensing unit 140 may sense whether a sliding portion of the portable terminal 100 is open or closed. Other examples include the sensing unit 140 sensing the presence or absence of power provided by the power supply unit 190, the presence or absence of a coupling or other connection between the interface unit 170 and an external device.

The output unit 150 is configured to output an audio signal, a video signal or a tactile signal. For example, the output unit 150 includes a display unit 151, an audio output module 152, an alarm 153, and a haptic module 154.

The display unit 151 may output information processed in the portable terminal 100. For example, when the portable terminal 100 is operating in a phone call mode, the display unit 151 provides a User Interface (UI) or a Graphic User Interface (GUI) which includes information associated with the call. As another example, if the portable terminal 100 is in a video call mode or a capturing mode, the display unit 151 may additionally or alternatively display images captured and/or received, the UI, or the GUI.

The display unit 151 may be implemented using, for example, a Liquid Crystal Display (LCD), a Thin Film Transistor-Liquid Crystal Display (TFT-LCD), an Organic Light-Emitting Diode (OLED), a flexible display, or a three-dimensional (3D) display. The display unit 151 may be implemented as a transparent type or an optical transparent type through which the exterior is visible, which is referred to as "transparent display." A representative example of the transparent display includes a Transparent OLED (TOLED).

The rear surface of the display unit 151 may also be implemented to be optically transparent. Under this configuration, a user can view an object positioned at a rear side of a terminal body through a region occupied by the display unit 151 of the terminal body.

Two or more display units 151 may be provided according to a configured aspect of the portable terminal 100. For example, a plurality of the display units 151 may be arranged on one surface to be spaced apart from or integrated with each other, or may be arranged on different surfaces.

If the display unit 151 and a touch sensitive sensor (referred to as a "touch sensor") have a layered structure therebetween, the structure may be referred to as "touch screen." The display unit 151 with a touch screen may be used as an input device as well as an output device. The touch sensor may be implemented as a touch film, a touch sheet, or a touch pad.

The touch sensor may be configured to convert changes in pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

The proximity sensor 141 may be arranged at an inner region of the portable terminal 100 covered by the touch screen, or near the touch screen. The proximity sensor 141 is configured to sense presence or absence of an object approaching a surface to be sensed, or an object disposed near a surface to be sensed, by using an electromagnetic field or infrared rays without a mechanical contact. The proximity sensor 141 tends to have a longer lifespan and a more enhanced utility compared to a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, or an infrared rays proximity sensor. When the touch screen is implemented as a capacitance type, proximity of a pointer to the touch screen is sensed by changes of an electromagnetic field. In this case, the touch screen or touch sensor may be categorized into a proximity sensor 141.

Hereinafter, for the sake of brief explanation, a status that the pointer is positioned to be proximate onto the touch screen without contact will be referred to as "proximity touch," whereas a status that the pointer substantially comes in contact with the touch screen will be referred to as "contact touch." For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns, such as distance, direction, speed, time, position, and moving status. Information relating to the sensed proximity touch and the sensed proximity touch patterns may be output to the touch screen.

The audio output module 152 may output audio data received from the wireless communication unit 110 or stored in the memory 160, in a call-receiving mode, a call-placing mode, a recording mode, a voice recognition mode, and a broadcast reception mode. The audio output module 152 may output audio signals relating to functions performed in the portable terminal 100, for example, sound alarming a call received or a message received. For example, the audio output module 152 includes a receiver, a speaker, and a buzzer.

The alarm unit 153 outputs signals notifying occurrence of events from the portable terminal 100. The events occurring from the portable terminal 100 may include call received, message received, key signal input, and touch input. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized as part of the alarm unit 153.

The haptic module 154 generates various tactile effects which a user can feel. A representative example of the tactile effects generated by the haptic module 154 includes vibration. Vibration generated by the haptic module 154 may have a controllable intensity and a controllable pattern. For example, different vibration may be output in a synthesized manner or in a sequential manner.

The haptic module 154 may further generate various tactile effects, including not only vibration, but also arrangement of pins vertically moving with respect to a skin being touched or contacted, air injection force or air suction force through an injection hole or a suction hole, touch by a skin surface, presence or absence of contact with an electrode, effects by stimulus such as an electrostatic force, and reproduction of cold or hot feeling using a heat absorbing device or a heat emitting device.

The haptic module 154 may be configured to transmit tactile effects or signals through a user's direct contact, or a user's muscular sense using a finger or a hand. Two or more haptic modules 154 may be provided according to the configuration of the portable terminal 100.

The memory 160 stores a program for the processing and control of the controller 180. Alternatively, the memory 160 may temporarily store input/output data, such as phonebook data, messages, still images, and video. Also, the memory 160 may further store data related to various patterns of vibrations and audio output upon the touch input on the touch screen.

The memory 160 may be implemented using any type of suitable storage medium including a flash memory type, a hard disk type, a multimedia card micro type, Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and a memory card type such as SD or DX memory. Furthermore, the portable terminal 100 may operate a web storage which performs the storage function of the memory 160 on the Internet.

The interface unit 170 may generally be implemented to interface the portable terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, or earphone ports.

The identification module may be configured as a chip for storing various information required to authenticate an authority to use the portable terminal 100, which may include a User Identity Module (UIM) or a Subscriber Identity Module (SIM). Also, the device having the identification module or an identification device may be implemented in a type of smart card. Hence, the identification device can be coupled to the portable terminal 100 via a port.

The interface unit 170 may also serve as a path for power to be supplied from an external cradle to the portable terminal 100 when the portable terminal 100 is connected to the external cradle or as a path for transferring various command signals input from the cradle by a user to the portable terminal 100. Such various command signals or power input from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, and video calls. The controller 180 may include a multimedia module 181 which provides multimedia playback. The multimedia module 181 may be configured as part of the controller 180 or as a separate component. The controller 180 may also perform pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. The software codes may be stored in the memory 160 and executed by the controller 180.

Referring to FIGS. 2A to 3B, a portable terminal 100 includes a first body 200 and a second body 300 rotatably connected to each other. Both the first and second bodies 200 and 300 may be foldably disposed.

Figure 2A:
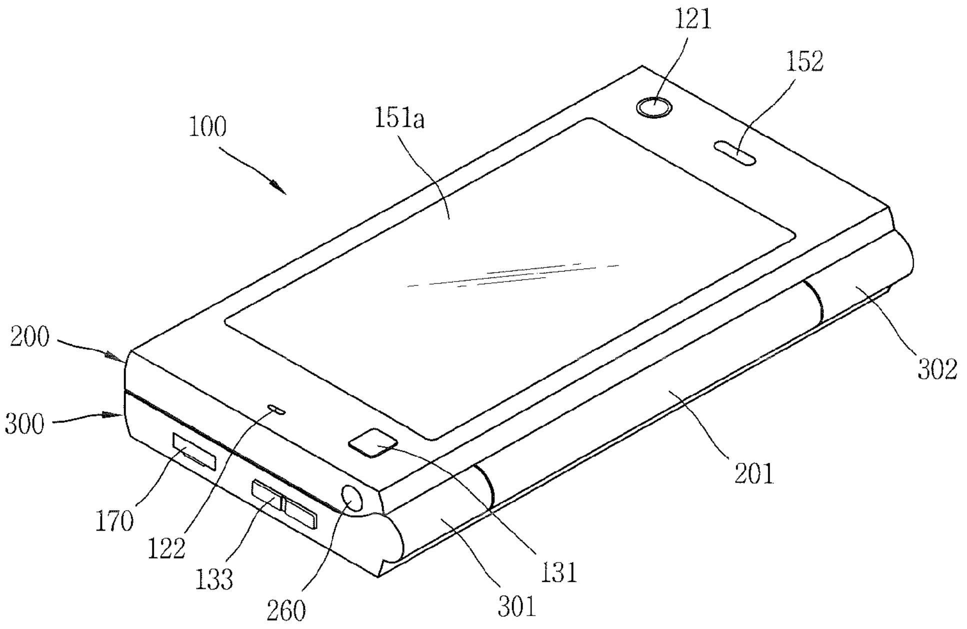
FIGS. 2A and 2B are a front perspective view and a rear perspective view, respectively, of a mobile terminal in accordance with one embodiment of the present invention, illustrating a folded configuration of the mobile terminal.
Figure 2B:
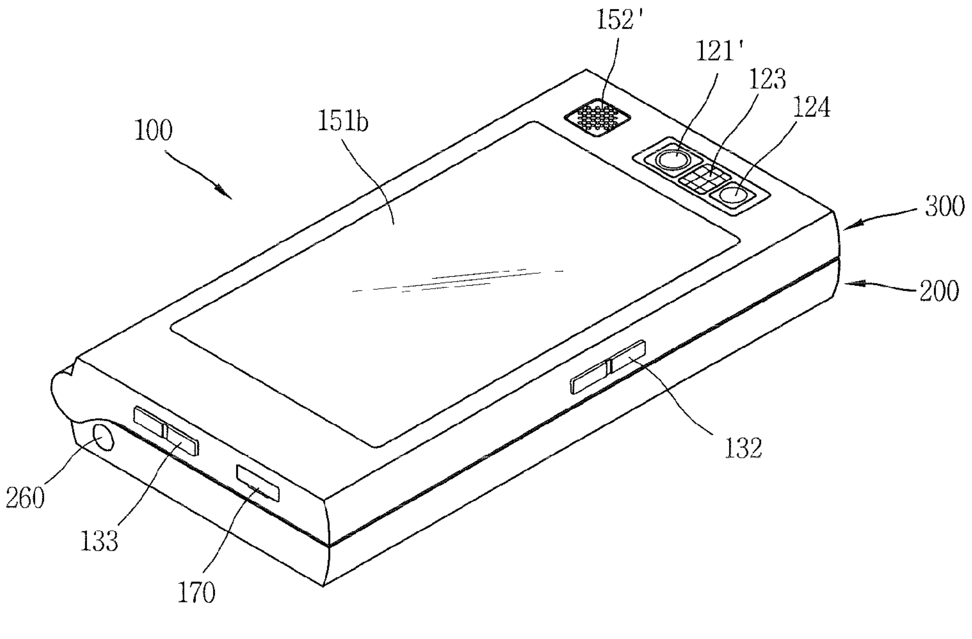
Figure 3A:
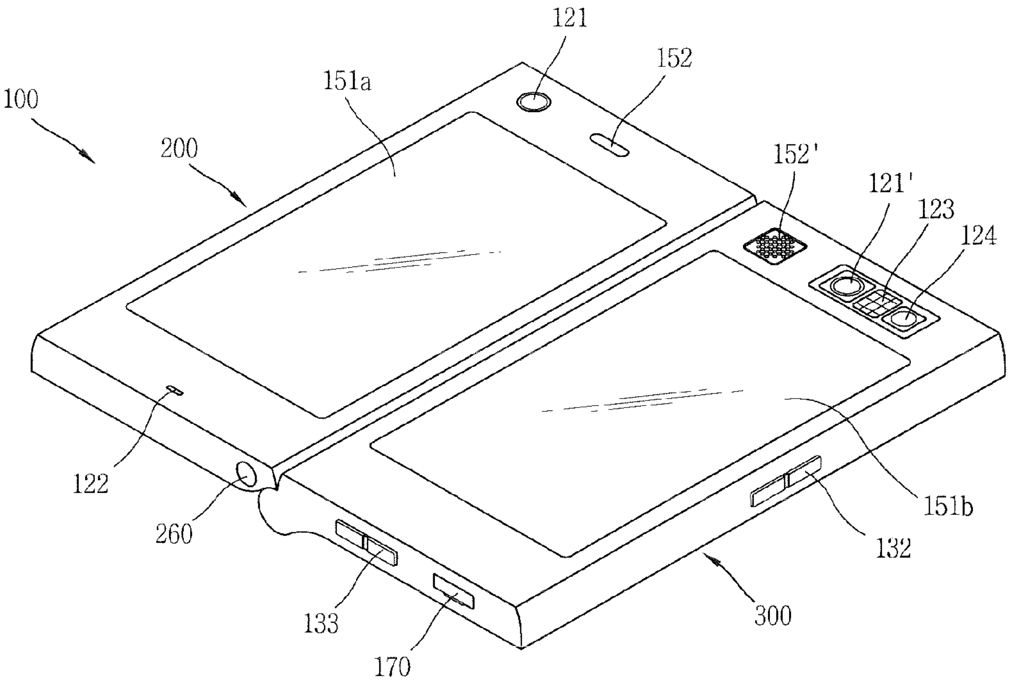
FIGS. 3A and 3B are a front perspective view and a rear perspective view, respectively, of a mobile terminal in accordance with one embodiment of the present invention, illustrating an unfolded configuration of the mobile terminal.
Figure 3B:
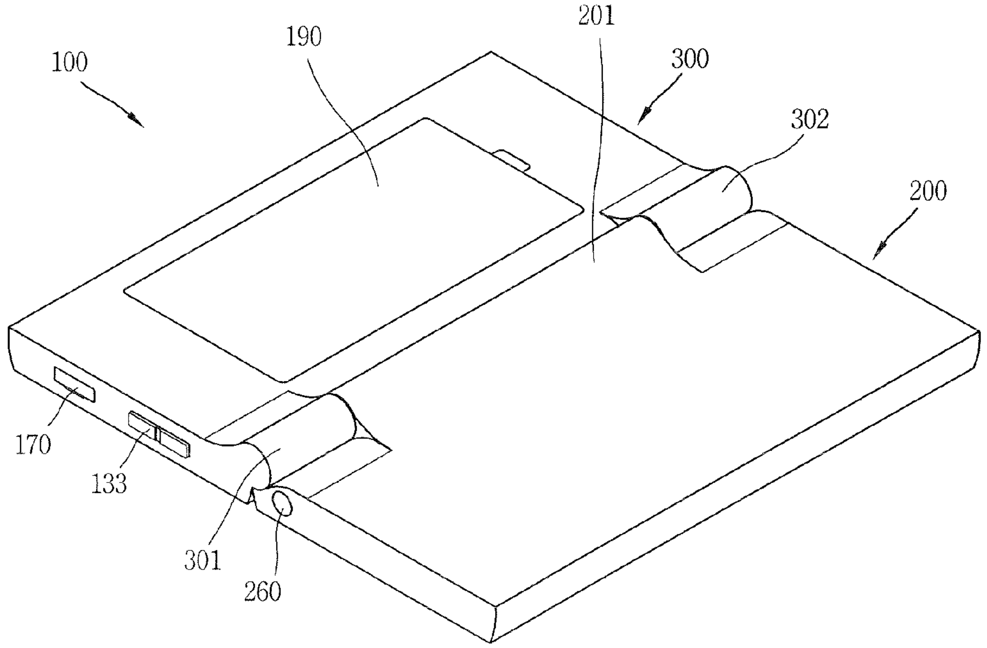

The overlapped or folded state between the first body 200 and the second body 300, as shown in FIGS. 2A and 2B, may be referred to as "closed" or "folded" configuration. As shown in FIGS. 3A and 3B, if the first and second bodies 200 and 300 relatively rotate from the folded configuration such that the unexposed parts in the folded configuration become exposed. This state is referred to as "open" or "unfolded" configuration.

In this disclosure, facing surfaces between the first body 200 and the second body 300, which are not exposed in the folded configuration, are referred to as "inner surfaces." Surfaces opposite to the inner surfaces or surfaces on each of the other side of the first body 200 and the second body 300 that are externally exposed in the folded configuration are referred to as "outer surfaces."

Each of the first and second bodies 200 and 300 may be configured by a case, such as casing, housing, or cover, forming its outer appearance. An inner space defined within the case may accommodate various electrical components. The cases may be formed by injection-molded synthetic resin or made of a metal, for example, stainless steel (STS) or titanium (Ti).

The first and second bodies 200 and 300 are connected to be relatively rotatable or foldable by a hinge unit. The hinge unit includes a first hinge portion 201 formed at the first body 200, and second and third hinge portions 301 and 302 formed at the second body 300. The second and third hinge portions 301 and 302 are rotatably coupled to both ends of the first hinge portion 201. Here, the hinge unit can be implemented according to embodiments that are different from the embodiment shown in FIGS. 2A-3B as long as it is able to rotatably connect the first and second bodies 200 and 300.

For example, a first display unit 151*a*, an audio output module 152, a camera 121, a first manipulation unit 131, and a microphone 122 are disposed on the outer surface of the first body 200. In one aspect of the present invention, the first display unit 151*a* occupies most of the outer surface of the first body 200, and the audio output module 152 and the camera 121 are disposed at an area adjacent to one end of both ends of the first display unit 151*a*, and the first manipulation unit 131 and the microphone 122 are disposed at an area adjacent to another end thereof.

A second display unit 151*b* is mounted on the outer surface of the second body 300, and also occupies most of the outer surface of the second body 300 according to an aspect of the present invention. As shown in FIG. 3A, the first and second bodies 200 and 300 may be disposed in parallel in the unfolded configuration. In such a case, the first and second display units 151*a* and 151*b* may have the same output direction. The first and second display units 151*a* and 151*b* may be implemented as a type of touch screen, and may be referred to as a "first touch screen" and a "second touch screen."

The user input unit 130 may be manipulated to allow inputting of commands for controlling operations of the portable terminal 100, and include a plurality of manipulation units 131 and 132. In accordance with this embodiment, the first manipulation unit 131 is disposed at the front surface of the first body 200 and the second manipulation unit 132 is disposed at a side surface of the second body 300. The manipulation units 131 and 132 may be referred to as a manipulation portion. Such manipulating portion can employ any tactile manner that a user can touch or tap for manipulation.

Contents input via the first and second manipulation units 131 and 132 may be variously set. For example, the first manipulation unit 131 may be configured to input commands such as START, END, or SCROLL, and the second manipulation unit 132 may be configured to input commands, such as adjusting a volume output from the audio output module 152 or converting the display unit 151 into a touch recognition mode.

Referring to FIG. 2B, a camera 121', an audio output module 152' may be further mounted at the outer surface of the second body 300. The camera 121' faces a direction which is opposite to a direction faced by the first camera 121, and may have different resolution from that of the camera 121 on the first body 200.

For example, the camera 121 may operate with relatively lower resolution, generating pictures of lower pixels. Thus, the first camera 121 may be useful when a user captures his face and sends it to another party during a video call. On the other hand, the camera 121' may operate with a relatively higher resolution, thus generating pictures of higher pixels, such that it can be useful for a user to obtain higher quality pictures for later use. The cameras 121 and 121' may be installed at the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

The audio output module 152' can cooperate with the audio output module 152 to provide stereo output. Further, the audio output module 152' may be configured to operate as a speakerphone.

A third manipulation unit 133 may further be disposed at a side surface of the second body 300. A broadcast signal receiving antenna 260 may further be disposed at a side of the first or second body 200 or 300 in addition to an antenna 260 for communications, for example. The antenna 260 as a part of the broadcast receiving module 111 may be retractable into the terminal body.

Referring to FIG. 3B, a power supply unit 190 for supplying power to the portable terminal 100 may be mounted in an inner surface of the first or second body 200 or 300. The power supply unit 190 may be mounted inside the terminal body, or detachable from the outside of the terminal body. The embodiment in FIG. 3B illustrates the power supply unit 190 as a type of a rechargeable battery mounted at the second body 300.

The above described portable terminal 100 has a form of a bar type terminal in the folded configuration. The portable terminal 100 is usually in a standby mode or a phone call mode in the folded configuration.

In the folded configuration, the first display unit 151*a* and the second display unit 151*b* output information in opposite directions and the orientation of the information displayed on the first display unit 151*a* and the second display unit 151*b* may be the same or different depending on applications being performed in the portable terminal 100. Further, the first display unit 151*a* and the second display unit 151*b* may be configured to be selectively activated in the folded configuration.

Upon converting the portable terminal 100 into the unfolded configuration, both the first and second display units 151*a* and 151*b* may be activated. If the first and second display units 151*a* and 151*b* function as touch screens, they output touchable visible information such as a soft key.

The first and second touch screens may operate in association with each other in the unfolded configuration. A user can use additional functions of the portable terminal 100, such as listening to music or watching video, playing games, and web-browsing, by using the first and second touch screens cooperating with each other in the unfolded configuration.

Figure 4A:
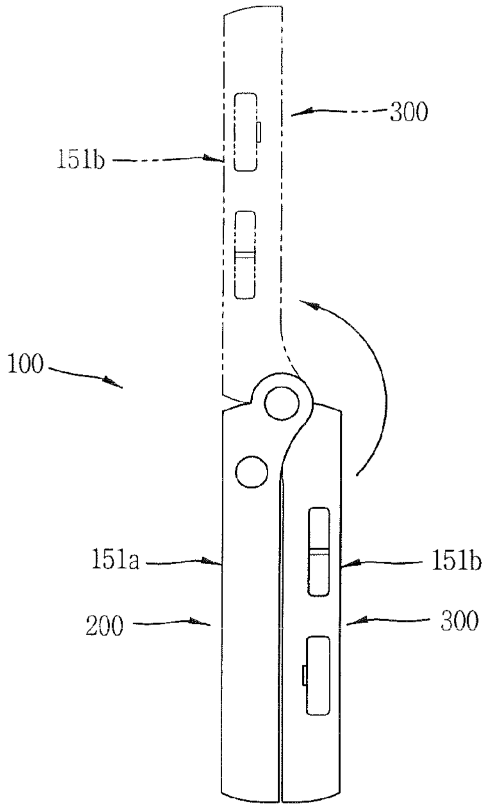
FIGS. 4A to 4C are side perspective views of a mobile terminal in accordance with one embodiment of the present invention, illustrating how the configuration of the mobile terminal is converted from a folded state into an unfolded state.

Referring to FIG. 4A, the inner surface of the first body 200 and the inner surface of the second body 300 face each other in the folded configuration. In this configuration, the first and second display units 151*a* and 151*b* are oriented in opposite directions.

Figure 4B:
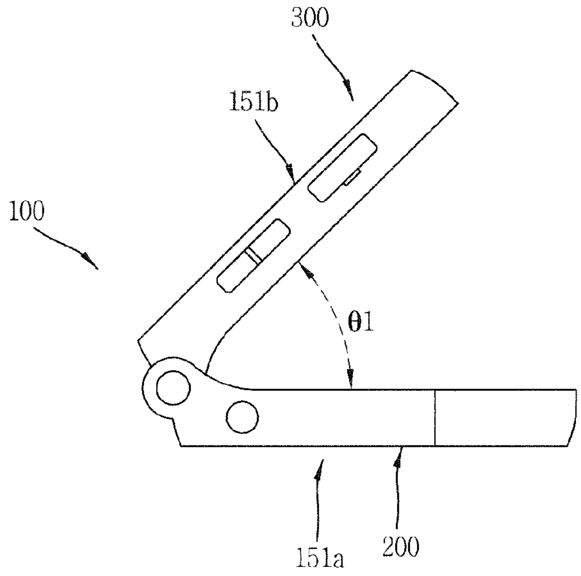
Figure 4C:
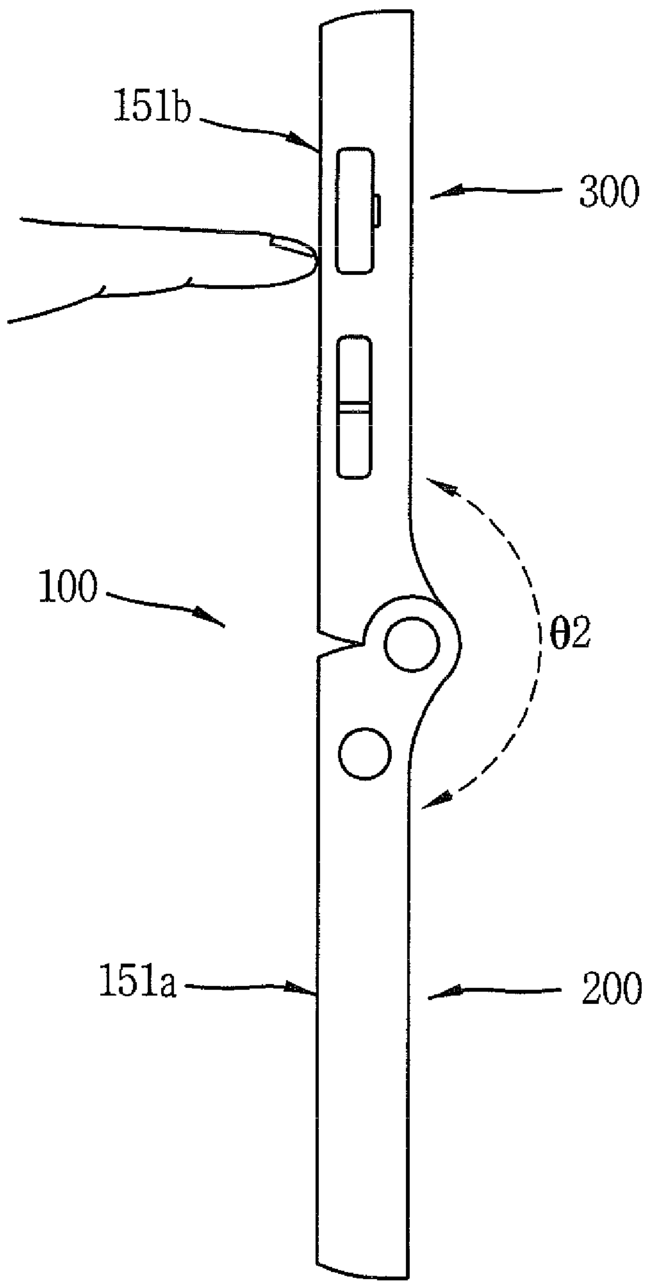

When the first body 200 and the second body 300 relatively rotate by a preset angle, as shown in FIG. 4C, the portable terminal 100 is converted into the unfolded configuration in which the first body 200 and the second body 300 are configured in parallel. FIGS. 4A-4C show that the second body 300 rotates with respect to the first body 200 centering around the hinge unit.

Referring to FIG. 4B, the second body 300 may be positioned between the folded configuration and the unfolded configuration, being drawn up from the first body 200 by a first angle θ1. This configuration may be referred as "intermediary" configuration.

In the intermediary configuration, the first body 200 may be placed on a surface and the second display 151*b* of the second body 300 is inclined by the preset angle from the surface. Accordingly, a user can conveniently view information output on the second display unit 151*b* when the portable terminal 100 is placed on the surface without holding the portable terminal 100. For example, the first angle θ1 may be set to approximately 45°.

Alternatively, the portable terminal 100 may stand by placing end portions of both the first body 200 and the second body 300 on the surface, the portable terminal being in a partially open state. In this state, the first display unit 151*a* and the second display unit 151*b* may be viewed from two opposite directions by at least two different viewers.

Therefore, the first display unit 151*a* and the second display unit 151*b* may display two separate information on each display for the at least two different viewers or display the same information at once. When the display unit 151*a* and the second display unit 151*b* display the same information, the two display units 151*a* and 151*b* may be used interactively by the at least two different users, for example, in a game application.

If the second body 300 is further rotated from the state shown in FIG. 4B by a second angle θ2 with respect to the first body 200, as shown in FIG. 4C, the portable terminal 100 is converted into the unfolded state. For example, the second angle θ2 is set to about 180° to 185° in the unfolded state.

In this disclosure, a direction that the first and second bodies 200 and 300 relatively rotate from the folded state to the unfolded state is referred to as a "forward" or "first" direction, and a direction that they relatively rotate from the unfolded state to the folded state is referred to as a "reverse" or "second" direction.

Accordingly, the inner surfaces of the first and second bodies 200 and 300 rotate away from each other along the forward direction while rotating toward each other along the reverse direction. FIGS. 4A to 4C illustrate that the second body 300 rotates relative to the first body 200 and the forward direction appears as a counterclockwise direction and the reverse direction appears as a clockwise direction.

In the unfolded configuration as shown in FIG. 4C, the first and second display units 151*a* and 151*b* are oriented in the same direction. The first and second display units 151*a* and 151*b* output visible information which is touch-inputtable, and a user can touch the visible information to enter input information to the portable terminal 100.

As described above, in one aspect of the present invention, the relative rotation of the first and second bodies 200 and 300 is suspended or temporarily stopped at the first angle θ1 when converting the portable terminal 100 from the folded configuration to the unfolded configuration or from the unfolded configuration to the folded configuration. Alternatively, the first and second bodies 200 and 300 may be configured to be converted from the folded configuration directly into the unfolded configuration without any stopping.

Upon applying touch input via at least one of the first and second display units 151*a* and 151*b* in the unfolded configuration, a rotational force may be applied by the touch input to the first and second bodies 200 and 300 in the reverse direction. For example, as shown in FIG. 4C, when the touch input is applied to the second display unit 151*b* by a pointer or finger in the unfolded configuration, pressure may be applied to the second body 300 such that the second body 300 is pushed back, thus decreasing the second angle θ2.

Accordingly, the first and second bodies 200 and 300 may be relatively rotated in the reverse direction due to the pressure generated by the touch input regardless of the user's intention even if the rotation is not desired. Hence, in order to obviate such unintentional or undesired rotation, a rotation preventing unit for preventing the first and second bodies 200 and 300 from relatively rotating in the reverse direction in the unfolded configuration may be provided between the first body 200 and the second body 300.

Figure 5:
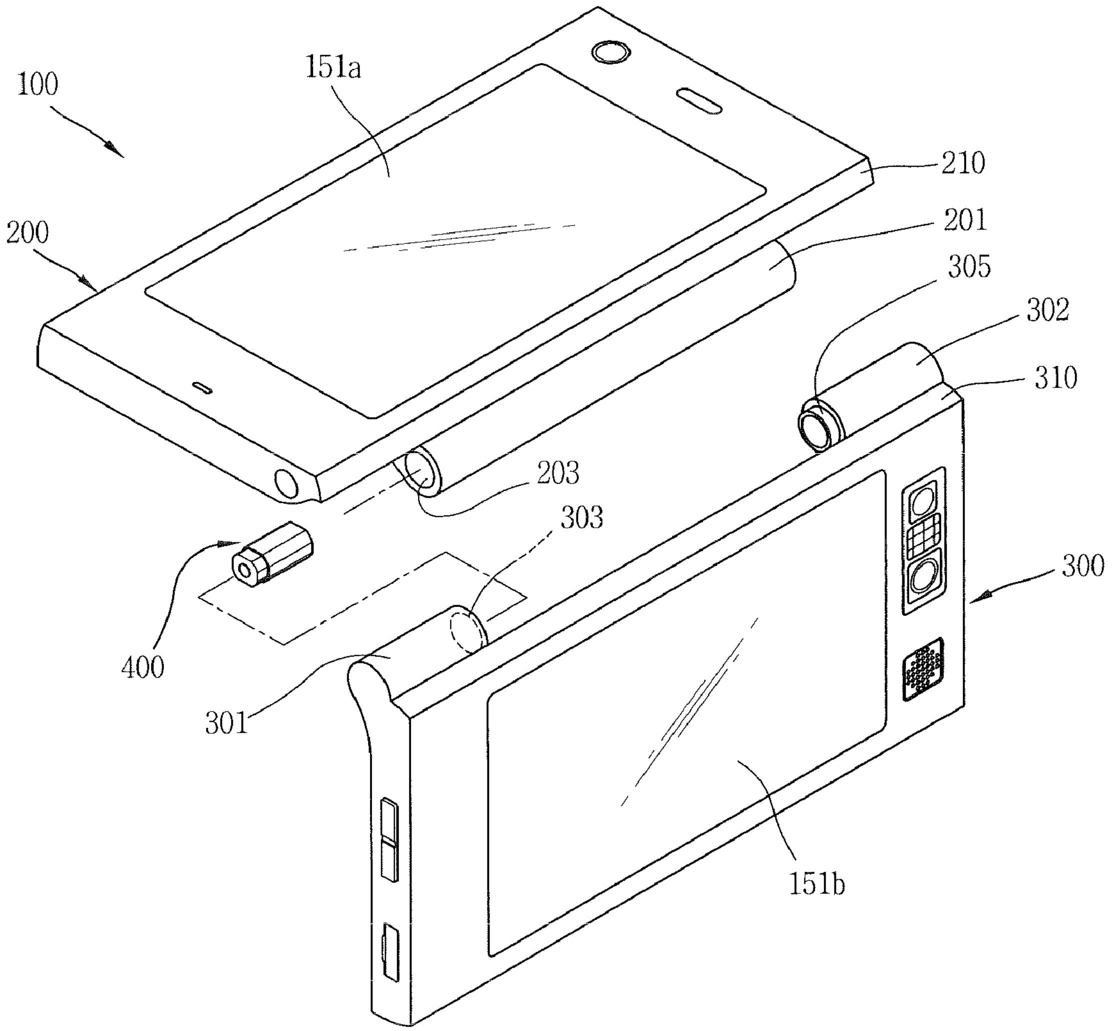
FIG. 5 is a disassembled perspective view of a mobile terminal in accordance with one embodiment of the present invention.

Referring to FIG. 5, a hinge module 400 may be mounted between the first hinge portion 201 of the first body 200 and the second hinge portion 301 of the second body 300. One end of the hinge module 400 is secured in an insertion groove 203 of the first hinge portion 201, and the other end of the hinge module 400 is secured in an insertion groove 303 of the second hinge portion 301.

The hinge module 400 connects the first and second hinge portions 201 and 301 to be relatively rotatable. Moreover, the hinge module 400 is configured to provide a relative rotational force to the first and second bodies 200 and 300 upon the relative rotation therebetween. For example, when a user relatively rotates the first and second bodies 200 and 300 by a preset angle, the hinge module 400 allows the first and second bodies 200 and 300 to rotate up to the preset angle.

A complementary hinge 305 for rotatably supporting the first and second hinge portions 201 and 301 may further be provided between the first and second hinge portions 201 and 301. The complementary hinge 305 serves as a shaft which rotatably connects the first and third hinges 201 and 302.

Figure 6:
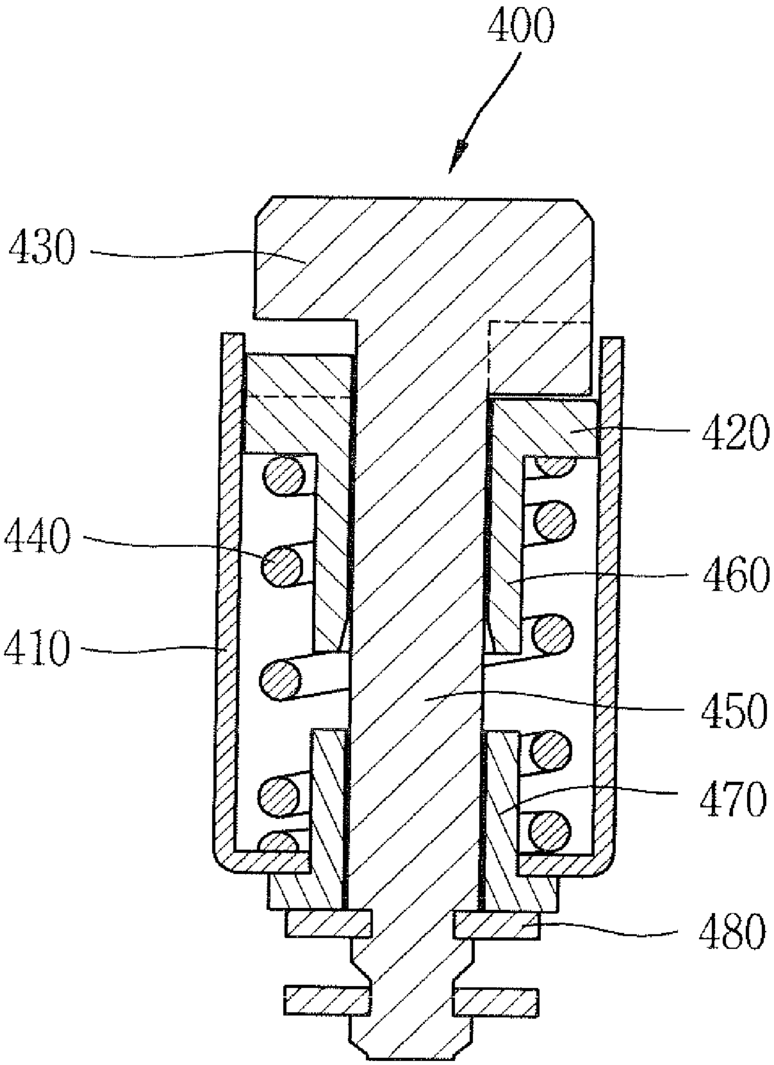
FIG. 6 is a cross-sectional view of a hinge module of a mobile terminal in accordance with one embodiment of the present invention.

Referring to FIG. 6, the hinge module 400 includes a housing 410, a fixed cam 430, a movable cam 420 and a spring 440. The housing 410 is fixed into the first hinge portion 201, and defines an inner space in which the movable cam 420 and the spring 440 are disposed.

The housing 410 may be formed in a cylindrical shape having one open end. The insertion groove 203 of the first hinge portion 201 may have a polygonal section and the section of the housing 410 may also be formed in a polygonal shape, such that the housing 410 can be secured to the insertion groove 203.

The fixed cam 430 may be fixed into the second hinge portion 201, and relatively rotatably connected with respect to the housing 410. The section of the fixed cam 430 may also be formed in a polygonal shape so as to be inserted into the second hinge portion 301 to be fixed thereto.

The movable cam 420 may be disposed within the housing 410 to be linearly movable therein, and provided with a cam surface at one end thereof to come in contact with the fixed cam 430. The movable cam 420 may be mounted not to rotate inside the housing 410, and contacts the fixed cam 430 so as to be relatively movable with each other.

The spring 440 may be disposed within the housing 410, and support another end of the movable cam 420. One end of the spring 440 is supported by an inner wall of the housing 410 and the other end of the spring 440 is supported by the movable cam 420.

The housing 410, the movable cam 420 and the fixed cam 430 are all connected by a cam shaft 450. The cam shaft 450 may be formed in a shape extending from the fixed cam 430. The cam shaft 450 may extend from the fixed cam 430 into the housing 410.

In one aspect of the present invention, the cam shaft 450 and the fixed cam 430 are integrally formed with each other. In another aspect of the present invention, the cam shaft 450 may be formed as a separate member from the fixed cam 430 so as to be coupled to the fixed cam 430.

The hinge module 400 may also be provided with a stabilizing unit 460, which serves to support the cam shaft 450 for preventing movement, vibration or shaking between the first and second hinge portions 201 and 301 in the unfolded configuration or folded configuration, particularly in the unfolded configuration. The stabilizing unit 460 may be formed on the movable cam 420, and support an outer circumferential surface of the cam shaft 450.

Figure 7:
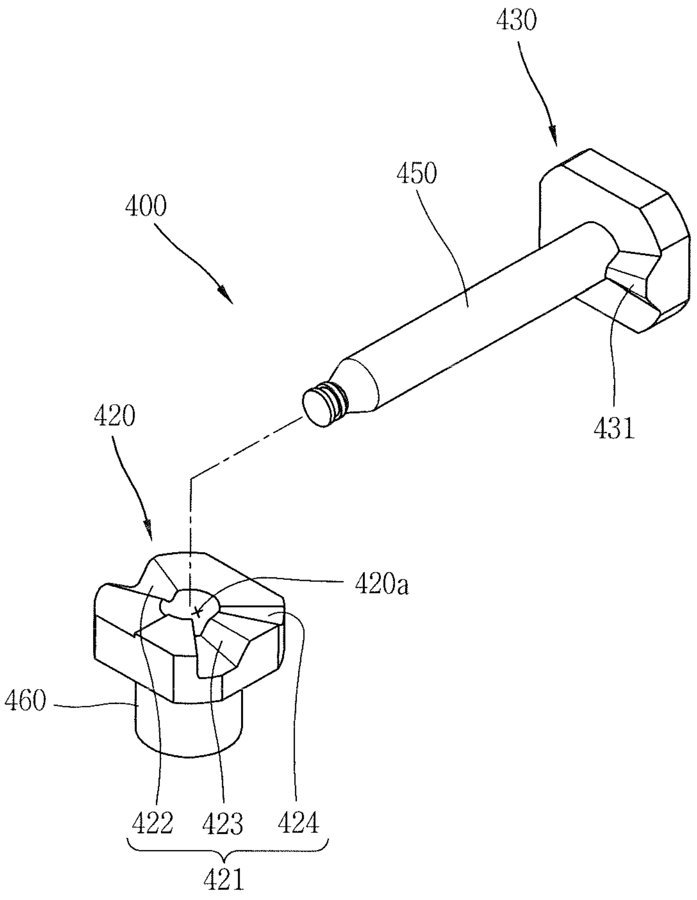
FIG. 7 is a perspective view of a hinge module of a mobile terminal in accordance with one embodiment of the present invention, showing constructions of a fixed cam and a movable cam.

Referring to FIG. 7, the movable cam 420 may be provided with a through hole 420*a* through which the cam shaft 450 is inserted. The stabilizing unit 460 may be formed in a cylindrical shape extending from a periphery of the through hole 420*a* in an insertion direction of the cam shaft 450.

As such, the stabilizing unit 460 of the movable cam 420 supports the cam shaft 450 of the fixed cam 430 and can prevent movement, vibration or shaking which may occur to the first and second bodies 200 and 300 in the unfolded configuration, thereby keeping the first and second bodies 200 and 300 stable. The stabilizing unit 460 may also prevent movement, vibration or shaking which may occur to the first and second bodies 200 and 300 even in the folded configuration or while the first and second bodies 200 and 300 rotate with respect to each other, as well as in the unfolded configuration.

The housing 410 may further be provided with a bushing 470 for supporting the cam shaft 450, as shown in FIG. 6. The bushing 470 and the cam shaft 450 each may be provided with fixing rings 480.

A rotation preventing unit may be disposed in the hinge module 400 so as to prevent the first and second bodies 200 and 300 from randomly or unintentionally rotating in the unfolded configuration. As shown in FIG. 7, the rotation preventing unit may include a first cam profile 431 formed at the fixed cam 430 and a second cam profile 421 formed at the movable cam 420.

The first cam profile 431 may protrude from one side of the cam shaft 450. The first cam profile 431 may be formed at only one portion of the fixed cam 430, in order for an angle of the relative rotation of the first and second bodies 200 and 300, namely, the second angle θ2, to be in the range of at least 180°.

Figure 8:
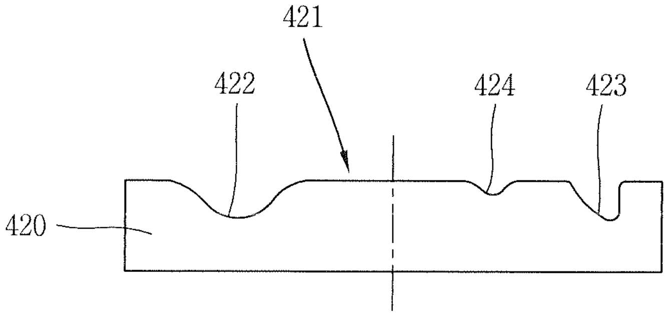
FIG. 8 is a schematic view of a second cam profile of a movable cam included in a hinge module of a mobile terminal in accordance with one embodiment of the present invention.

The second cam profile 421 may include a first stopping portion 422 at which the first cam profile 431 is stopped, locked, or engaged in the unfolded configuration. The first stopping portion 422 is formed by recessing a cam surface of the second cam profile 421, as shown in FIGS. 7 and 8.

The second cam profile 421 may further include a second stopping portion 423 at which the first cam profile 431 is stopped in the folded configuration, and a third stopping portion 424 at which the first cam profile 431 is stopped at the intermediary configuration. The second and third stopping portions 423 and 424 may be formed by recessing the cam surface of the second cam profile 421 similar to the first stopping portion 422.

The second and third stopping portions 423 and 424 are formed at a plurality of portions along a circumferential direction of the movable cam 420 from the first stopping portion 422. The angle between the second stopping portion 423 and the third stopping portion 424 may correspond to the first angle θ1, and the angle between the second stopping portion 423 and the first stopping portion 422 may correspond to the second angle θ2. In one aspect of the present invention, the third stopping portion 424 may have a shallower depth than those of the first and second stopping portions 422 and 423, as shown in FIG. 8 so as to render the first and second bodies 200 and 300 retained in less firmly stopped states compared to the folded and unfolded configurations.

Intervals among the first to third stopping portions 422, 423 and 424 may be embodied to have various tilt angles depending on a relative rotational force to be desirably generated. Such intervals are embodied to be almost flush so as to be implemented as a “free-stop hinge.” Also, the relative rotational force is generated only when the first and second bodies 200 and 300 rotate into specific configurations, such as the folded configuration, unfolded configuration, and intermediary configuration.

The first cam profile 431 is suspended by being stopped at the second stopping portion 423 in the folded configuration. When the first and second bodies 200 and 300 relatively rotate, the housing 410 and the movable cam 420 of the first hinge portion 201 perform a relative rotation with respect to the fixed cam 430 of the second hinge portion 301.

As the first cam profile 431 relatively moves with respect to the second cam profile 421, the movable cam 420 linearly moves in the housing 410. Accordingly, the spring 440 is compressed. When the movable cam 420 and the fixed cam 430 go beyond a dead point, the movable cam 420 is restored to its original position by an elastic restoring force of the spring 440. During this process, the relative rotational force is generated between the movable cam 420 and the fixed cam 430.

When the first and second bodies 200 and 300 meet at the first angle θ1, the first cam profile 431 is stopped at the third stopping portion 424. Accordingly, the relative rotation of the first and second bodies 200 and 300 is suspended at the first angle θ1, and the angle between the first and second bodies 200 and 300 is retained at the first angle θ1. In this state, when the first and second bodies 200 and 300 relatively rotate in the forward direction, the first cam profile 431 moves relative to the second cam profile 421.

When the first and second bodies 200 and 300 meet at the second angle θ2, the first cam profile 431 is stopped at the first stopping portion 422. Accordingly, the relative rotation of the first and second bodies 200 and 300 is suspended at the second angle θ2, and the first and second bodies are converted into and retained in the unfolded state.

A process of converting the portable terminal 100 from the unfolded configuration into the folded configuration is similar to the above described process, but may be performed in the reverse order. Therefore, the process will not be described separately.

Figure 9A:
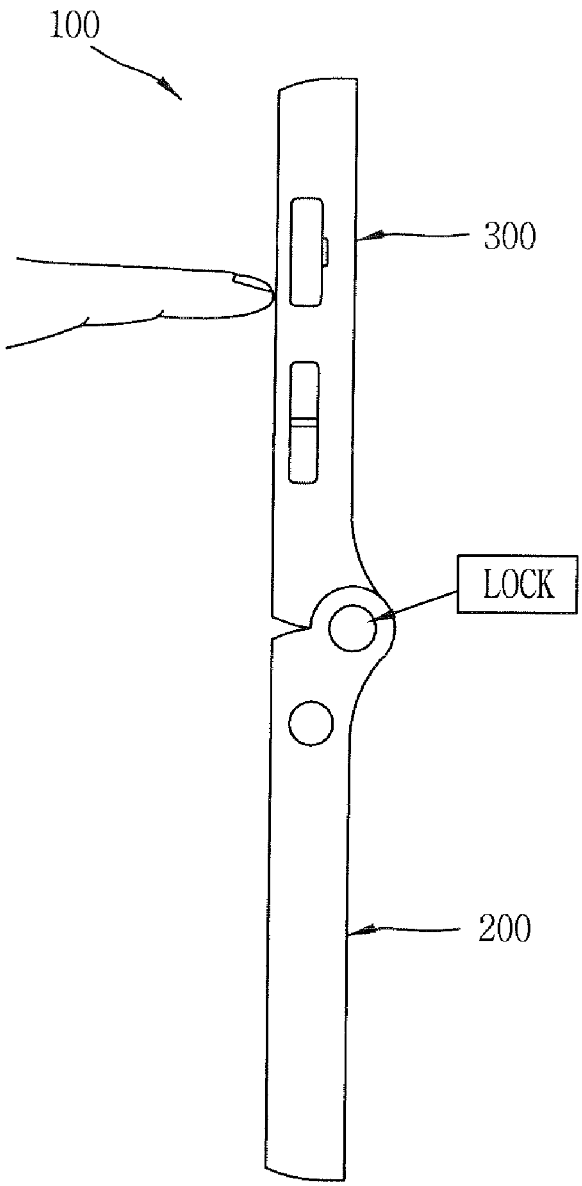
FIGS. 9A and 9B are side views of a mobile terminal in accordance with another embodiment of the present invention.

Referring to FIG. 9A, a locking unit may further be provided for locking the first and second bodies 200 and 300 in the unfolded configuration. The locking unit may lock the first and second bodies 200 and 300 such that they do not perform the relative rotation even when an external force is applied thereto in the unfolded configuration.

Figure 9B:
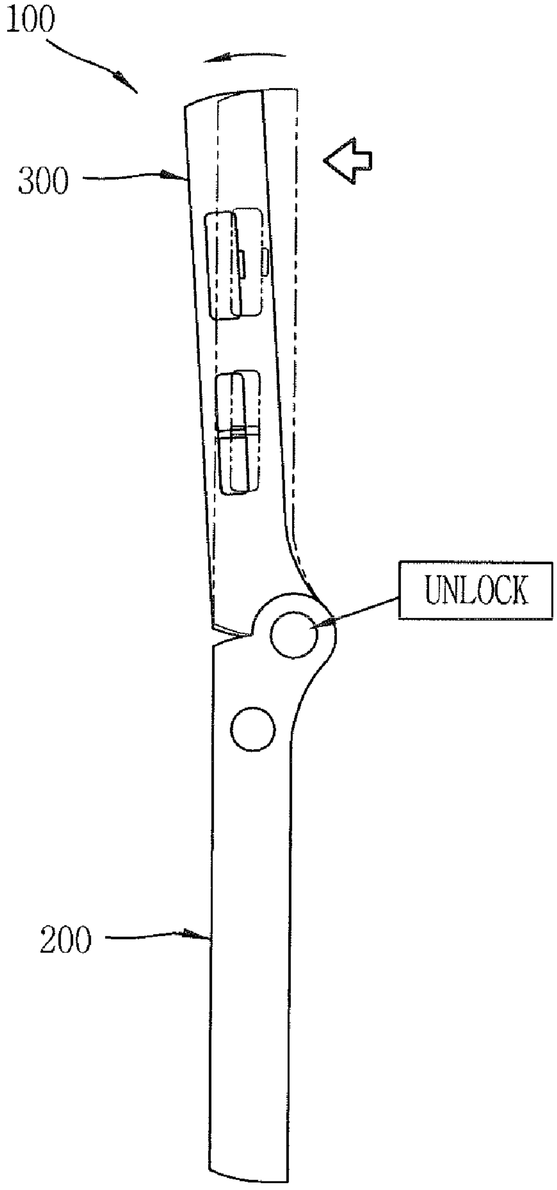

Referring to FIG. 9B, the portable terminal 100 may include an unlocking unit for unlocking the first and second bodies 200 and 300, thus allowing forward rotation of the first and second bodies 200 and 300. If the first and second bodies 200 and 300 relatively rotate slightly or by a preset angle in the forward direction in the locked state, the unlocking unit unlocks the first and second bodies 200 and 300, which in turn are able to relatively rotate in the reverse direction as well.

FIG. 9B illustrates that the second body 300 rotated in a counterclockwise direction so as to release the locked state. In order to convert the portable terminal 100 from the unfolded configuration to the folded configuration, the first and second bodies 200 and 300 are relatively rotated slightly in the forward direction so as to unlock the first and second bodies 200 and 300, and thereafter the bodies 200 and 300 are relatively rotated in the reverse direction so as to convert the portable terminal 100 to the folded configuration. The locking unit and the unlocking unit may be configured as a single assembly, which may be referred to as a “locking-unlocking unit.”

Figure 10:
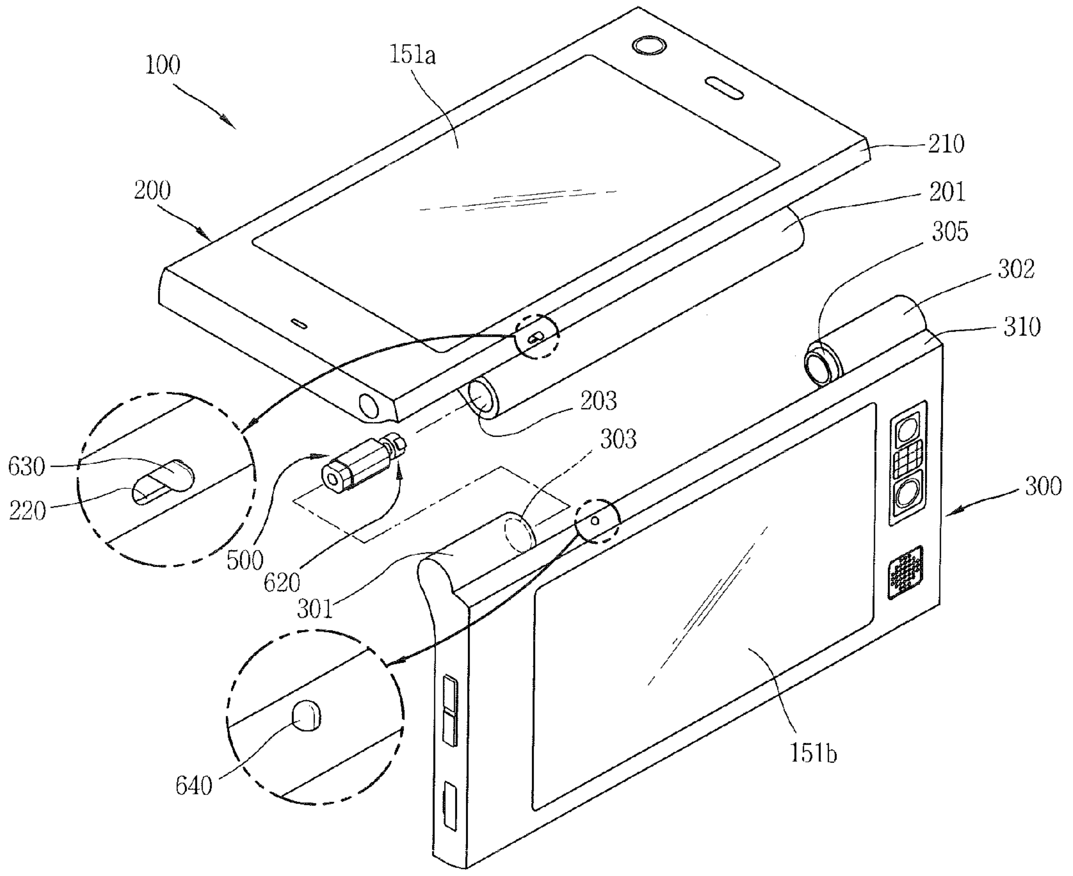
FIG. 10 is a disassembled perspective view showing a mobile terminal in accordance with another embodiment of the present invention.
Figure 11:
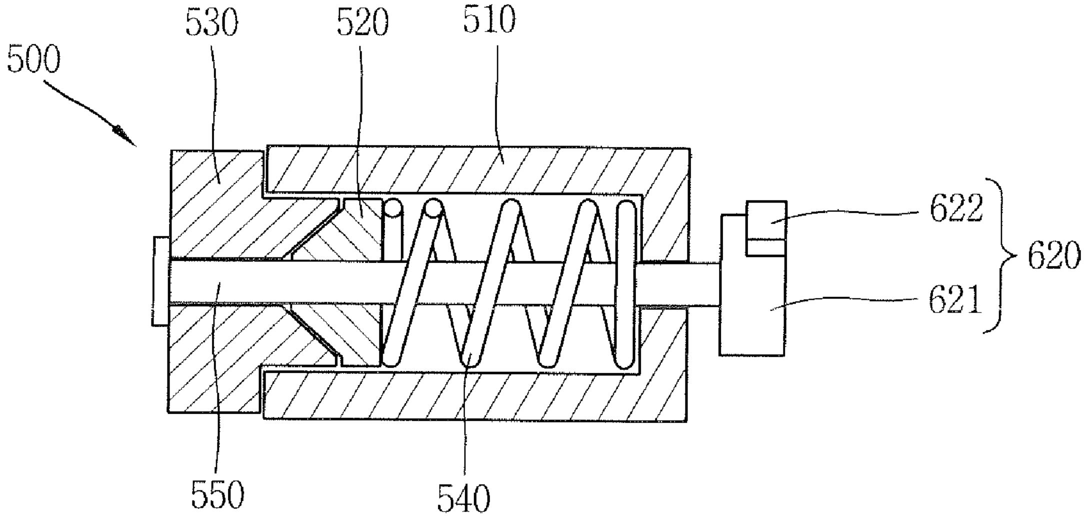
FIG. 11 is a cross-sectional view of a hinge module of a mobile terminal in accordance with another embodiment of the present invention.

Referring to FIGS. 10 and 11, a hinge module 500 may be mounted between the first hinge portion 201 of the first body 200 and the second hinge portion 301 of the second body 300. According to another embodiment of the present invention, the hinge module 500 includes a housing 510, a movable cam 520, a fixed cam 530 and a spring 540 similar to the previously described embodiment. The same reference numerals are given in the drawings for the same components as those in the previous embodiment, so they will be understood by the description of the previous embodiment.

Figure 12A:
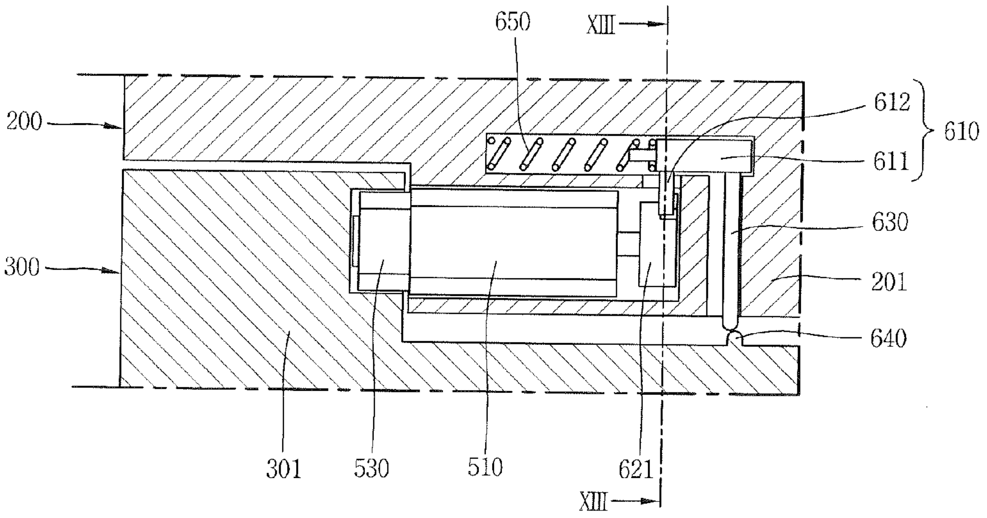
FIGS. 12A and 12B are cross-sectional views showing a locking unit and an unlocking unit of a mobile terminal in accordance with yet another embodiment of the present invention.
Figure 12B:
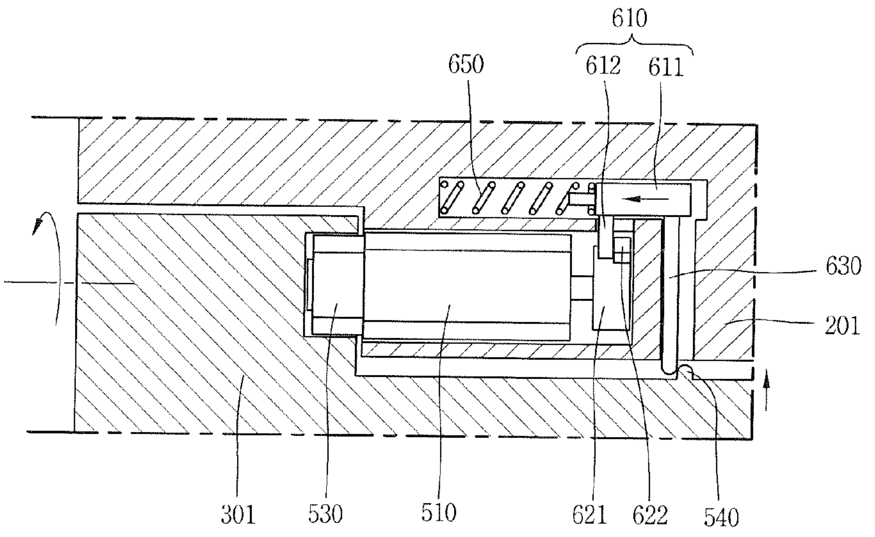

Referring to FIGS. 12A and 12B, the locking unit may include a first stopper 610 disposed within the first body 200 and a second stopper 620 (shown in FIG. 11) formed at the hinge module 500. The first stopper 610 may be disposed at a position adjacent to the first hinge portion 201 to be linearly movable.

The first stopper 610 may be movable in a direction parallel to a lengthwise direction of a cam shaft 550. The first stopper 610 may include a body 611 and a stopping protrusion 612. The stopping protrusion 612 may protrude from the body 611 toward the first hinge portion 201.

As shown in FIG. 11, the second stopper 620 may be formed at an end portion of the cam shaft 550, rotates integrally with the fixed cam 530, and stops at the first stopper 610 upon the conversion to the unfolded configuration. The second stopper 620 may include an extending portion 621 extending from an end portion of the cam shaft 550, and a cam portion 622 formed at an outer circumferential surface of the extending portion 621.

The cam shaft 550 may penetrate through the housing 510 to extend to the outside of the housing 510, and the extending portion 621 may be formed at the extended end portion. The extending portion 621 may have a disc shape, and the cam portion 622 may be provided with a cam curved surface at which the stopping protrusion 612 is stopped.

Figure 13A:
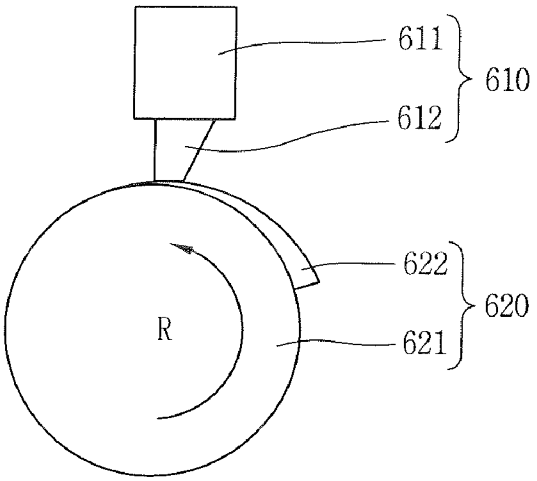
FIGS. 13A and 13B are cross-sectional views showing first and second stoppers of a locking unit and an unlocking unit in a mobile terminal in accordance with yet another embodiment of the present invention.
Figure 13B:
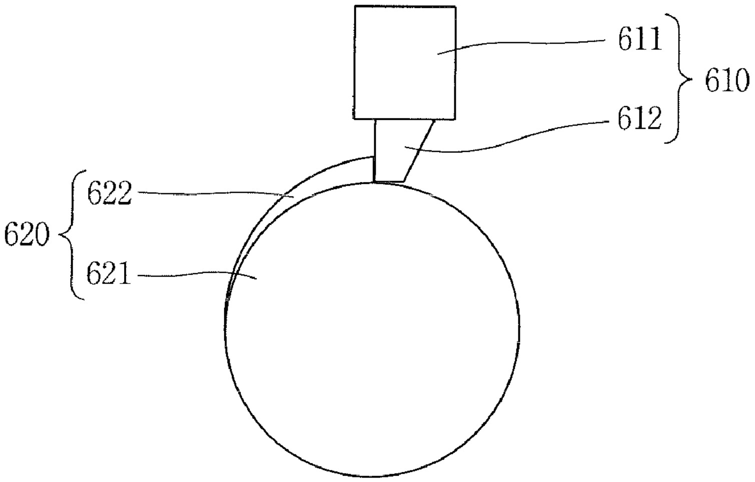

FIGS. 13A and 13B are views showing constructions and operations of the first and second stoppers 610 and 620, which are cross-sectional views taken along the line XIII-XIII of FIG. 12A. A converting process from the folded configuration to the unfolded configuration is shown in FIG. 13A.

Referring to FIG. 13A, when the first and second bodies 200 and 300 relatively rotate, the fixed cam 530 is rotated and accordingly the extending portion 621 extending from the cam shaft 550 is cooperatively rotated. That is, as the second body 300 rotates in the forward direction, the extending portion 621 is rotated in a counterclockwise direction. As one end of the cam portion 622 is moved toward the stopping protrusion 612 and kept moving, the stopping protrusion 612 is deformed.

Referring to FIG. 13B, if the cam portion 622 is kept moving such that the end portion of the cam portion 622 is moved past the stopping protrusion 612, the stopping protrusion 612 is stopped at the cam portion 622. Accordingly, a clockwise rotation of the extending portion 621 is restricted. Hence, the reverse rotation of the second body 300 is restricted as well.

Referring back to FIGS. 10, 12A and 12B, the unlocking unit may include an extending protrusion 630 formed at the first stopper 610, and a push protrusion 640 formed at the second body 300. The extending protrusion 630 may extend from the body 611 of the first stopper 610 to the outside of the first body 200. The extending protrusion 630 may be positioned such that the extending protrusion 630 is spaced apart from the stopping protrusion 612 by a preset gap.

As shown in FIG. 10, a slot 220 may be formed through a side surface, namely a first side surface 210, of the first body 200. The extending protrusion 630 may be disposed to protrude outside the first body 200 via the slot 220. The extending protrusion 630 may be disposed to be linearly movable in the slot 220.

The second body 300 may have a side surface, namely a second side surface 310, facing the first body 200 in the unfolded configuration, and the push protrusion 640 may protrude from the second side surface 310. The push protrusion 640 may be formed at a position facing the extending protrusion 630 in the unfolded configuration.

The push protrusion 640 is configured to push the extending protrusion 630 in cooperation with the forward rotation of the first and second bodies 200 and 300 in the unfolded state, thereby moving the first stopper 610. To this end, the extending protrusion 630 and the push protrusion 640 may be located such that their centers are spaced from each other by a preset gap.

Referring to FIG. 12B, the first stopper 610 is linearly moved in a lengthwise direction of the cam shaft 550 by interaction between the extending protrusion 630 and the push protrusion 640. Accordingly, the stopping protrusion 612 is moved in the lengthwise direction of the cam shaft 550, thereby being unlocked from the cam portion 622.

Hence, the extending portion 621 is allowed to be rotated in the clockwise direction, as shown in FIGS. 13A and 13B, and the first and second bodies 200 and 300 are allowed to be relatively rotated in the reverse direction. An end portion of the first stopper 610 is supported by a restoring spring 650, and restored to its original position by an elastic force provided from the restoring spring 650 upon moving.

Figure 14:
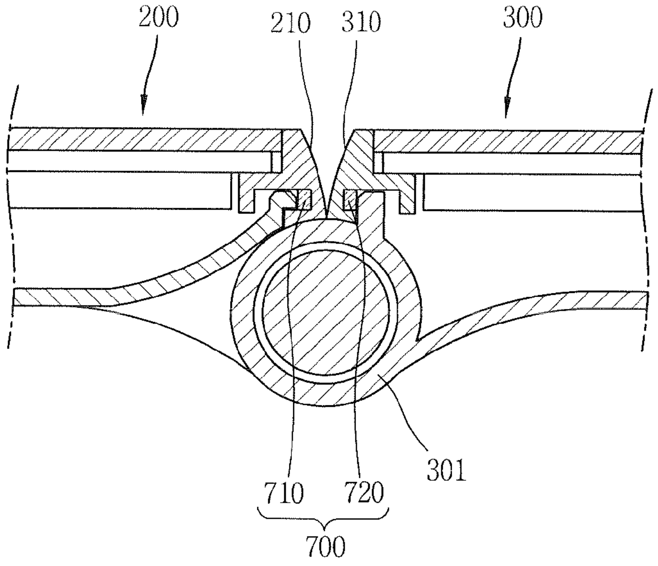
FIG. 14 is a cross-sectional view showing an anti-vibration unit of a mobile terminal in accordance with yet another embodiment of the present invention.

Referring to FIG. 14, a stabilizing unit 700 may further be provided between the first and second bodies 200 and 300 for preventing shaking, vibration, and movement of the first and second bodies 200 and 300. The stabilizing unit 700 functions to secure the first and second bodies 200 and 300 so as to prevent shaking or vibration of the first and second bodies 200 and 300 in the unfolded configuration.

The stabilizing unit 700 may include a first magnet 710 disposed at the first side surface 210, and a second magnet 720 disposed at the second side surface 310. The facing surfaces of the first and second magnets 710 and 720 in the unfolded configuration have different polarities.

The first and second magnets 710 and 720 may be mounted in the cases of the first and second bodies 200 and 300, respectively, and thus, the first and second magnets 710 and 720 are not exposed externally. Magnetic forces generated between the first and second magnets 710 and 720 secure the positions of the first and second bodies 200 and 300 in the unfolded configuration, thereby preventing shaking or vibration of the first and second bodies 200 and 300.

Figure 15A:
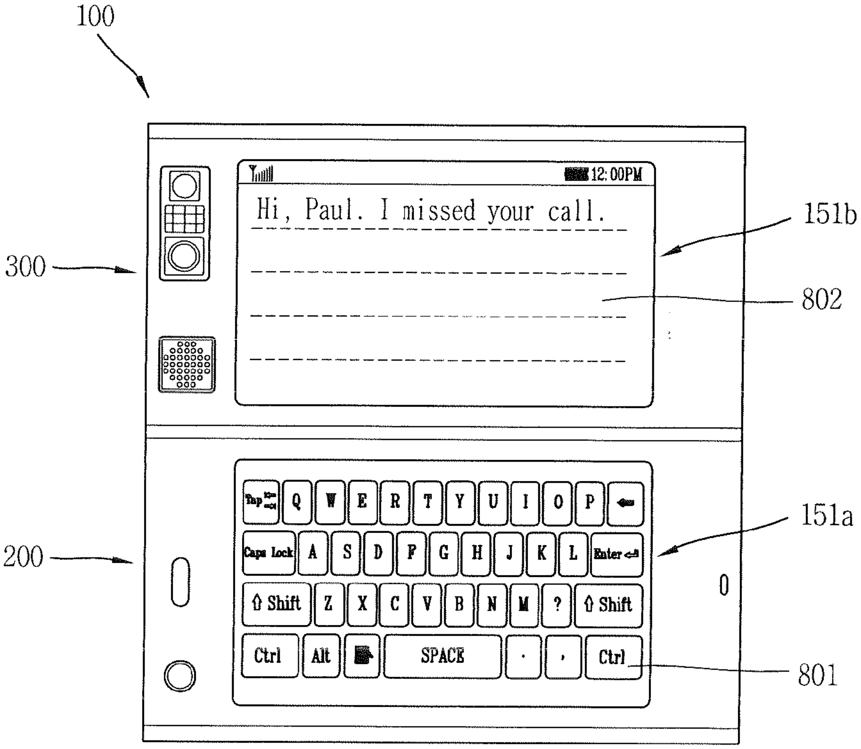
FIGS. 15A to 15C are plane views of a mobile terminal in accordance with yet another embodiment of the present invention showing first and second display units in the unfolded configuration.
Figure 15B:
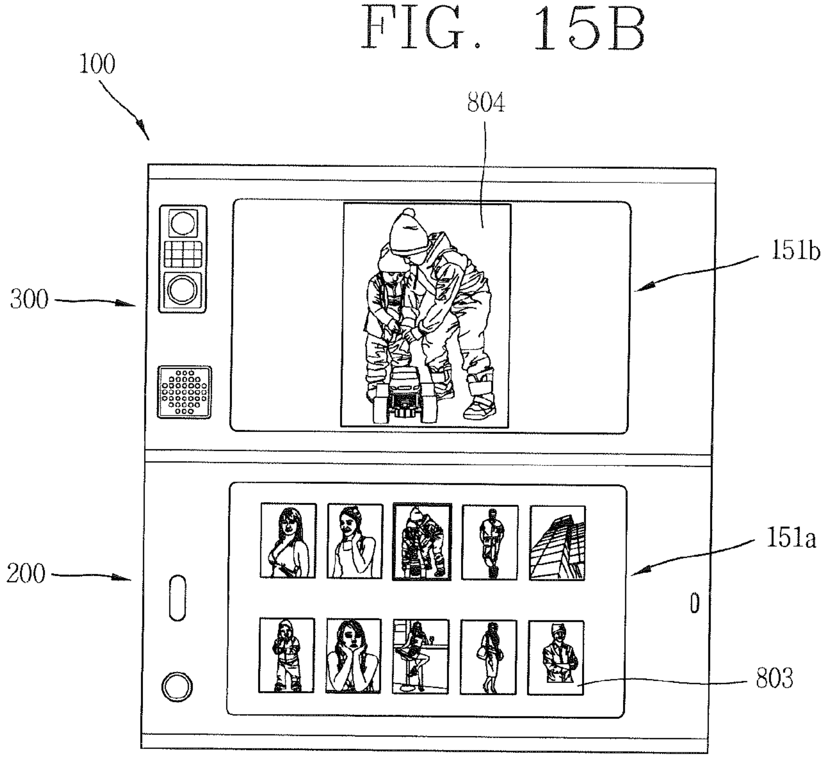
Figure 15C:
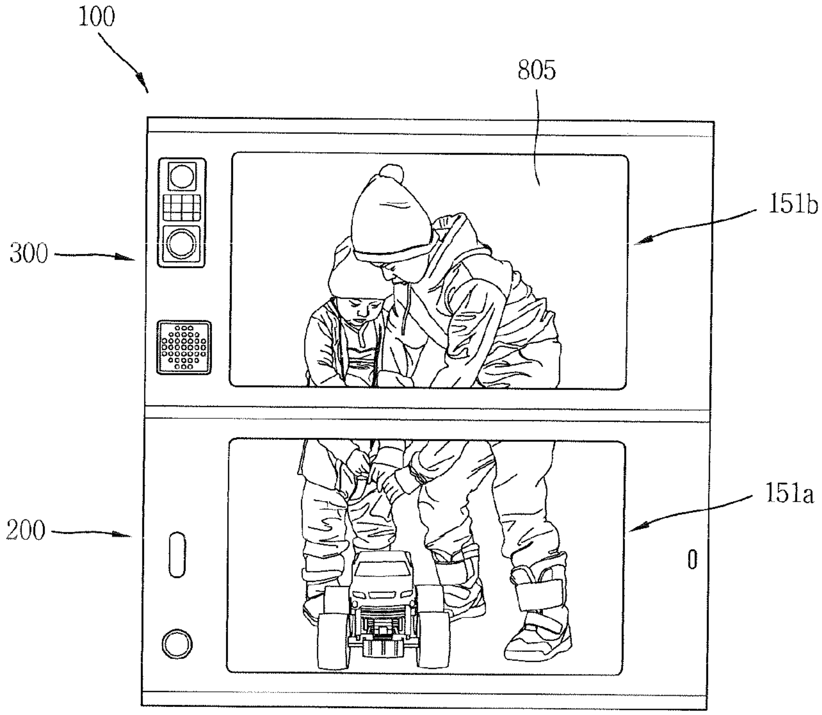

FIGS. 15A to 15C show several examples of the first and second display units 151*a* and 151*b* being operated in the unfolded configuration of the portable terminal 100 according to an embodiment of the present invention. If the first and second display units 151*a* and 151*b* are implemented as touch screens, the first and second display units 151*a* and 151*b* can cooperatively operate in the unfolded configuration. For example, if first visible information output on the first display unit 151*a* is touched, second visible information related to the first visible information can be output on the second display unit 151*b*.

FIG. 15A illustrates soft keys 801 as an example of the first visible information, and a text output window 802 as an example of the second visible information. The soft keys 801 may indicate keys arranged in a format of a keypad representing at least one characters, numbers, symbols, graphics or icons. The keypad may be implemented in at least one arrangement format of character keys, numeral keys and function keys.

In one aspect of the present invention, the soft keys 801 have the QWERTY configuration, which allows a user to enter text more conveniently. When a user touches the soft keys 801, text corresponding to the touch inputs is displayed on the text output window 802.

In another aspect of the present invention, the first visible information may be at least one selectable item, and the second visible information may be detailed information of an item selected. For example, as shown in FIG. 15B, a plurality of icons 803 are output on the first display unit 151*a* and the plurality of icons 803 include reduced size photos stored in the portable terminal 100. When one of the plurality of icons 803 is touched or selected, the second display unit 151*b* displays detailed information or an enlarged version of the selected one of the plurality of icons 803.

FIG. 15C illustrates that the first and second display units 151*a* and 151*b* are used in combination to display a single image, thus operating as a single combined screen 805. Accordingly, the portable terminal 100 can be used to output visible information on a larger screen or single combined screen 805.

In addition to the above described examples of operating the first and second display units 151*a* and 151*b*, they may also be operated in various other manners. As described above, the present disclosure provides a new form factor having touch screens disposed on outer surfaces of first and second bodies which are foldably coupled. The present disclosure further provides a structure capable of preventing a reverse rotation of the first and second bodies in the unfolded configuration of the portable terminal 100.

Moreover, the present disclosure provides a structure capable of preventing shaking or vibration which may occur when the first and second bodies of a portable terminal are in the unfolded configuration. Furthermore, the present disclosure provides a locking-unlocking structure capable of locking and unlocking the first and second bodies in the unfolded configuration of a portable terminal. Accordingly, a portable terminal according to an embodiment of the present invention can support various user interface environments via first and second touch screens that are oriented in the same direction in the unfolded configuration.

The aforesaid configuration and method for the portable terminal are not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal comprising:

a first body having a first hinge portion;

a first touch screen on an outer surface of the first body;

a second body having a second hinge portion;

a second touch screen on an outer surface of the second body;

a hinge module configured to rotatably connect the first and second hinge portions to facilitate relative rotation of the first and second bodies in a first direction for an unfolded configuration in which the first touch screen and the second touch screen face the same direction and a second direction for a folded configuration in which the first touch screen and the second touch screen face each other, wherein the hinge module comprises a housing secured to the first hinge portion and having an inner space, a movable cam disposed in the inner space of the housing to be linearly movable, a fixed cam secured to the second hinge portion and configured to contact one end of the movable cam to perform the relative rotation, and a spring disposed in the housing and configured to support the other end of the movable cam;

a locking unit configured to lock the first and second bodies in the unfolded configuration, the locking unit comprising a first linearly movable stopper disposed in the first body and a second stopper rotating together with the fixed cam and configured to stop at the first stopper such that the first stopper and the second stopper are locked when the first body and the second body are in the unfolded configuration;

an unlocking unit configured to unlock the first and second bodies that are locked in the unfolded configuration when the first and second bodies are further relatively rotated in the first direction by a preset angle in the unfolded configuration; and a rotation preventing unit provided in the hinge module and configured to prevent relative rotation of the first body and the second body in the second direction in the absence of an action for the relative rotation when the portable terminal is in the unfolded configuration, wherein the unlocking unit comprises an extending protrusion extending from the first stopper toward the outside of the first body and a push protrusion formed at the second body and configured to move the first stopper when the extending protrusion is pushed to release the locked first and second stoppers.

2. The terminal of claim 1, wherein the first and second touch screens are configured to be selectively activated in the folded configuration.

3. The terminal of claim 1, wherein the first and second touch screens are exposed in both the folded and unfolded configurations.

4. The terminal of claim 1, wherein the first and second touch screens are configured to operate as a combined screen in the unfolded configuration such that single information is displayed on the combined screen, the first touch screen displaying a portion of the single information and the second touch screen displaying the rest of the single information.

5. The terminal of claim 1, wherein the rotation preventing unit comprises:

a first cam profile formed at the fixed cam; and a second cam profile formed at the movable cam and comprising a first stopping portion at which the first cam profile is stopped and secured in the unfolded configuration.

6. The terminal of claim 5, wherein the second cam profile further comprises:

a second stopping portion at which the first cam profile is stopped and secured in the folded configuration; and a third stopping portion at which the first cam profile is stopped and secured in an intermediary configuration that is between the folded configuration and the unfolded configuration, the terminal being in a partially folded or unfolded state in the intermediary configuration.

7. The terminal of claim 1, wherein:

the fixed cam comprises a cam shaft extending from the fixed cam; and the hinge module further comprises a stabilizing unit formed at the movable cam and configured to stabilize the first and second bodies by preventing vibration or movement between the first and second hinge portions in the unfolded configuration and to support an outer circumferential surface of the cam shaft.

8. The terminal of claim 7, wherein the movable cam is provided with a through hole through which the cam shaft is inserted and the stabilizing unit has a cylindrical shape extending from a periphery of the through hole toward the cam shaft.

9. The terminal of claim 1, wherein:

the first stopper is provided with a stopping protrusion protruding toward the hinge module;

the fixed cam is provided with a cam shaft; and the second stopper is provided with an extended portion extending from the cam shaft and a cam portion formed at an outer circumferential surface of the extended portion such that the stopping protrusion is stopped by the cam portion.

10. The terminal of claim 1, wherein the first body is provided with a slot into which the extending protrusion is inserted.

11. The terminal of claim 1, wherein the unlocking unit further comprises a restoring spring configured to restore the first stopper to an original position upon the movement of the first stopper.

12. The terminal of claim 1, further comprising a stabilizing unit disposed between the first and second bodies and configured to prevent relative movement or vibration of the first and second bodies in the unfolded configuration.

13. The terminal of claim 11, wherein:

the first and second bodies each comprise first and second side surfaces facing each other in the unfolded configuration; and the stabilizing unit comprises a first magnet disposed at the first surface and a second magnet disposed at the second side surface.

14. The terminal of claim 1, wherein:

the rotation preventing unit comprises the locking unit; and the locking unit is further configured to lock the first and second bodies in the unfolded configuration upon receiving a touch input applied to at least the first touch screen or second touch screen in the unfolded configuration.

15. The terminal of claim 1, wherein the rotation preventing unit is further configured to:

prevent relative rotation in the second direction when a force of a touch input applied to at least the first touch screen or the second touch screen is weaker than a threshold force such that the first and second touch screens do not rotate in response to the touch input; and allow relative rotation in the second direction when the force of the touch input applied to at least the first touch screen or the second touch screen is stronger than the threshold force.

* * * * *